(12) United States Patent
Rollwage et al.

(10) Patent No.: US 7,213,456 B2
(45) Date of Patent: May 8, 2007

(54) DEVICE FOR MEASURING THE LEVEL OF A FLUID IN A FUEL TANK OF A MOTOR VEHICLE

(75) Inventors: Mathias Rollwage, Ditzingen (DE); Klaus Marx, Stuttgart (DE); Peter Traub, Stuttgart (DE); Stefan Muelders, Ditzingen-Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 10/790,844

(22) Filed: Mar. 3, 2004

(65) Prior Publication Data

US 2004/0187569 A1    Sep. 30, 2004

(30) Foreign Application Priority Data

Mar. 19, 2003   (DE) ................................. 103 12 101

(51) Int. Cl.
*G01F 23/00* (2006.01)
*G01F 23/28* (2006.01)

(52) U.S. Cl. .................. 73/290 V; 73/290 R; 181/124

(58) Field of Classification Search ............. 73/290 V; 181/124; 324/323; 367/87
See application file for complete search history.

(56) References Cited

U.S. PATENT DOCUMENTS

| | | | | |
|---|---|---|---|---|
| 4,090,407 A | * | 5/1978 | Shuler et al. ............. | 73/290 V |
| 4,675,660 A | * | 6/1987 | Boscolo .................... | 73/290 V |
| 4,909,080 A | * | 3/1990 | Kikuta et al. ............. | 73/290 V |
| 5,085,077 A | * | 2/1992 | Stapleton et al. ......... | 73/290 V |
| 5,172,594 A | * | 12/1992 | Dyke ........................ | 73/290 V |
| 5,226,320 A | * | 7/1993 | Dages et al. .............. | 73/290 V |
| 5,471,872 A | * | 12/1995 | Cummings ................ | 73/290 V |
| 6,629,457 B1 | * | 10/2003 | Keller ....................... | 73/290 V |
| 6,951,131 B2 | * | 10/2005 | Sawert et al. ............. | 73/290 V |
| 2004/0226362 A1 | * | 11/2004 | Marx et al. ............... | 73/290 V |

* cited by examiner

*Primary Examiner*—Hezron Williams
*Assistant Examiner*—Samir M. Shah
(74) *Attorney, Agent, or Firm*—Ronald E. Greigg

(57) ABSTRACT

A device for measuring the level of a fluid in a container by means of a sound guide tube and an ultrasonic transducer disposed inside the container mounted in a fluid feeding device within the container.

18 Claims, 3 Drawing Sheets

DEVICE FOR MEASURING THE LEVEL OF A FLUID IN A FUEL TANK OF A MOTOR VEHICLE

BACKGROUND OF THE INVENTION

1. Field of the Invention

The invention is based on a device for measuring a fill level of a liquid in a container.

2. Description of the Prior Art

A device for measuring a fill level is known from DE 199 42 378 A1, in which a ultrasonic transducer is disposed outside a fuel tank, near one end of a sound guide conduit that is provided between a container bottom and a top wall. The ultrasonic transducer sends ultrasonic waves into the sound guide conduit, and the ultrasonic waves are reflected at a surface of the fluid. The ultrasonic waves reflected are received by the ultrasonic transducer and evaluated in an evaluation unit. A fill level is ascertained from a transit time of the ultrasonic waves. A disadvantage of this is that a low level near the container bottom can no longer be measured, since when the level is low, the transit time of the emitted ultrasonic wave is so brief that the emitted ultrasonic wave has not yet decayed before the reflected ultrasonic wave already comes back. Thus the device has a comparatively high minimally measurable fill level.

OBJECT AND SUMMARY OF THE INVENTION

The device for measuring a fill level according to the invention, has the advantage over the prior art that an improvement is attained in a simple way, such that despite the possibility of measuring even the tiniest fill level heights, a simple disposition of the device in the container is possible, since the device of the invention is disposed on a fluid feeding device that protrudes into the container. As a result, the manufacturers of containers no longer need to provide mounts in or on the container for securing devices for measuring a fill level. Mounting the device of the invention on the fluid feeding device is substantially less expensive and simpler than mounting it on the container.

It is advantageous for the sound guide conduit and/or the ultrasonic transducer to be cast, glued, welded, clipped or screwed onto an outer circumference of the fluid feeding device, because these are especially inexpensive kinds of connections.

It is especially advantageous if following the forward-flow region, the sound guide conduit has at least one bend with a deflection and at least one straight region with a conduit slope angle, since in this way the transit time of the emitted sonic pulses can be adapted to the geometry of a given container. This is necessary because modern containers are constructed quite variably. From the transit time of the sonic pulse, the fill level is determined, and a conclusion about a fill volume is drawn by means of a characteristic curve stored in memory in an evaluation unit. Depending on the geometry of the container, an unfavorably great slope of the characteristic curve can occur. The great slope of the characteristic curve means a low sensitivity in measuring the fill level, since a slight change in the transit time of the sonic pulse means a major change in the fill volume. If the slope of the characteristic curve is great, an interval in the transit time from the minimally measurable fill level to the maximum fill level is small, making the sensitivity of measurement and hence the measurement precision less. By varying the number of bends and the number of straight regions, varying the angle of the deflection at a given bend, and varying the conduit slope angle of a given straight region of the sound guide conduit, it is possible for instance to adapt the transit time of the emitted sonic pulses, and hence the slope of the characteristic curve, in such a way that as much as possible over the entire range of the fill volume, high sensitivity and thus only a shallow slope of the characteristic curve are obtained. Especially at low fill levels, high sensitivity is necessary so that a driver of a motor vehicle will receive a precise, reliable fill level indication.

It is moreover advantageous to use a ultrasonic transducer which is both a transmitter and a receiver and is thus especially economical and also simplifies the device.

It is advantageous if the sound guide conduit has at least one reference reflection surface, because in this way interference variables, such as the temperature of the fluid, which has an influence on the speed of sound and hence on the transit time of the sonic pulses, can be compensated for afterward in an evaluation unit.

It is furthermore advantageous if the sound guide conduit has at least two openings, so that fluid can flow into the sound guide conduit and the same fill level can be established there as in the container. These openings assure a pressure equilibrium between the sound guide conduit and the container.

It is advantageous if the sound guide conduit provided on the fluid feeding device has a flexible portion on its upper end, so that it can adapt in its length to the variable spacing between a top wall and a bottom of the container.

BRIEF DESCRIPTION OF THE DRAWING

The invention will be better understood and further objects and advantages thereof will become more apparent from the ensuing detailed description of a preferred embodiment taken in conjunction with the drawings, in which.

DESCRIPTION OF THE PREFERRED EMBODIMENTS

Figure 1:
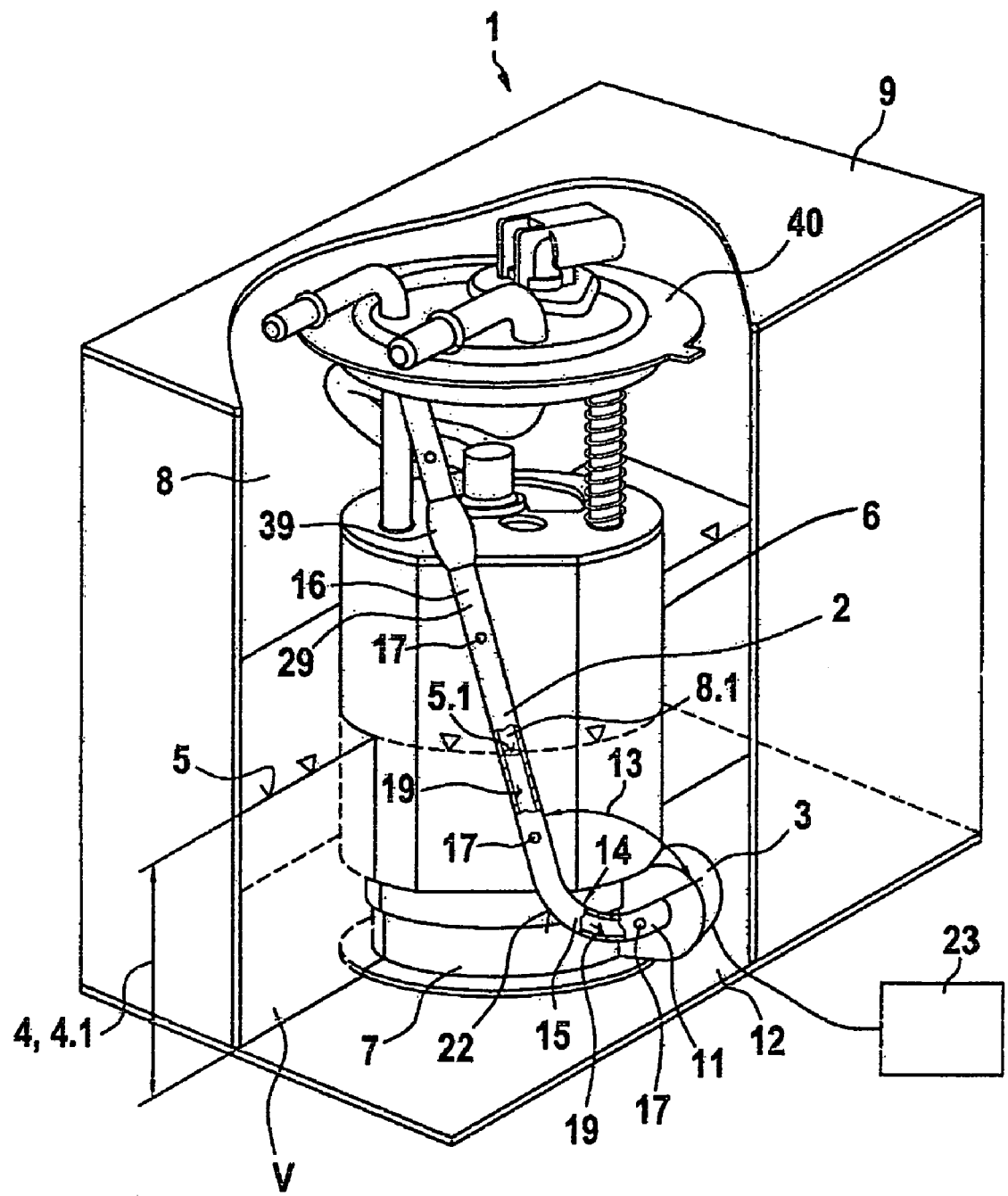
FIG. 1 shows a fluid feeding device with a device according to the invention for measuring a fill level in a container of a motor vehicle.

FIG. 1 shows a fluid feeding device, for instance a fuel pumping device, with a device according to the invention for measuring a fill level in a container, for instance a fuel tank of a motor vehicle. The device comprises a sound guide conduit 2 and a ultrasonic transducer 3. The sound guide conduit 2 and the ultrasonic transducer 3 are disposed on a fluid feeding device 6, which is inserted into a container such as a fuel tank 1.

The fuel feeding device 6 has at least one fuel pump, for instance an electric pump. However, it can also include other components, such as filter elements, pressure regulators, and check valves.

A fuel feeding device is disclosed for instance in German Patent Disclosure DE 44 35 508 A1 and in German Patent DE 196 17 496 C2, and the contents of these patent disclosures are hereby incorporated by reference.

As the fluid, fuel up to a fill level 4 is located in the fuel tank 1. The fuel in the fuel tank 1 has a fill volume V. At the height of the fill level 4, the fuel surface 5 is a boundary face between fuel and an empty volume 8 above it, which is filled with a gas mixture, for instance comprising air and volatized fuel. The fuel tank 1 can have any arbitrary shape and can for instance be embodied as a saddle tank or multichamber tank.

The ultrasonic transducer 3 is disposed on a lower end 7 of the fuel feeding device 6, on an outer circumference. The ultrasonic transducer 3 is for instance cast, glued, clipped, welded or screwed onto the outer wall of the fuel feeding device 6. A forward-flow region 11 of the sound guide conduit 2 directly adjoins the ultrasonic transducer 3. The sound guide conduit 2 is for instance cast, glued, clipped or welded onto the ultrasonic transducer 3.

Figure 2:
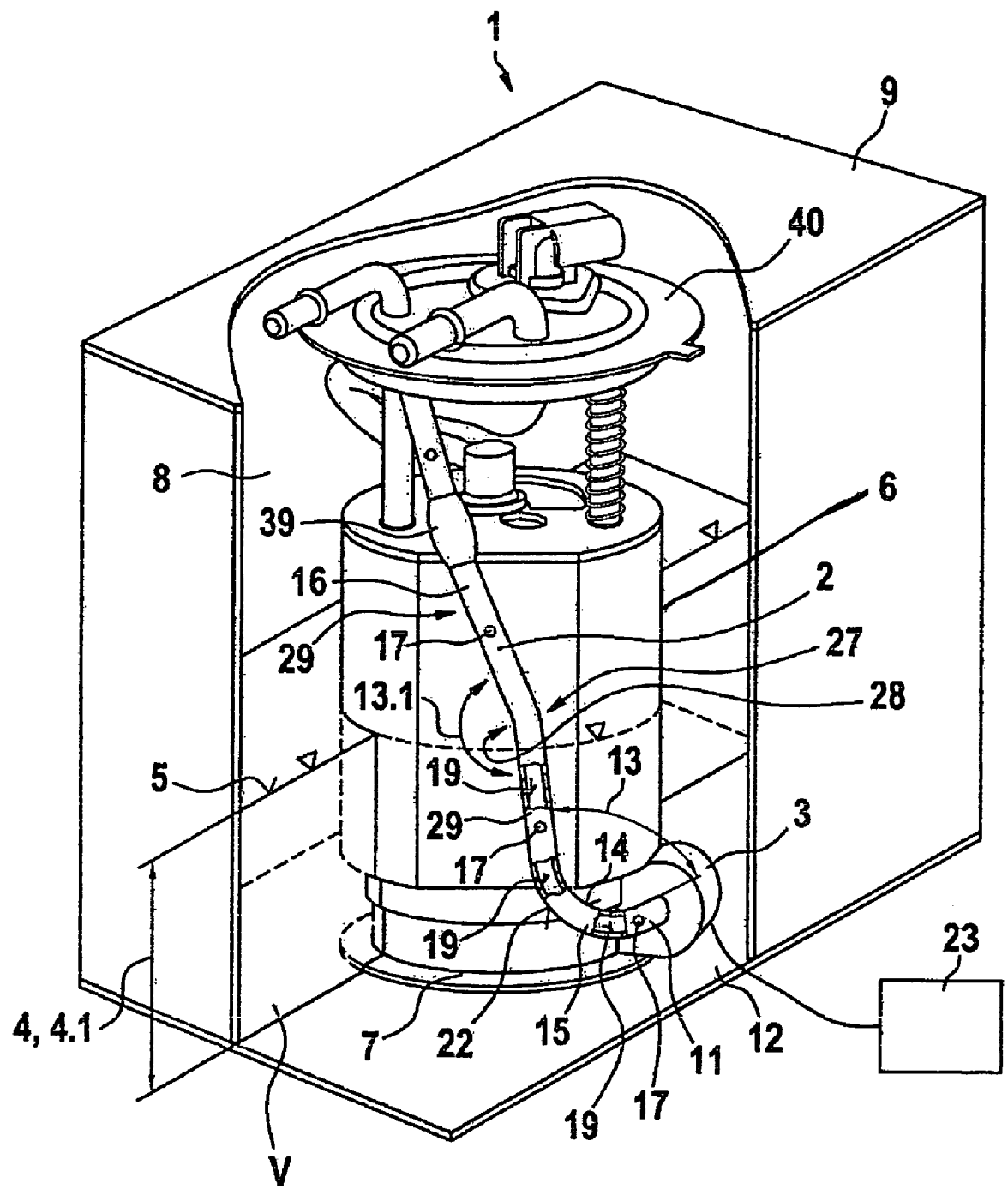
FIG. 2 shows a fluid feeding device with a further device according to the invention that has a sound guide conduit with a plurality of bends.

The sound guide conduit 2 extends from the ultrasonic transducer 3 in the forward-flow region 11, for instance in a straight line in the same horizontal direction as a container bottom 12 of the fuel tank 1. The forward-flow region 11 can, however, also be looped, with bends, or oblique with a slope. The sound guide conduit 2 has a measurement tube region 16, adjoining the forward-flow region 11. Adjoining the forward-flow region 11, the measurement tube region 16 has a first bend 15 and a deflection 13, and the bend has a bending radius 14. The deflection 13 amounts to 90°, for instance, but can also be less than or greater than 90°. The term deflection 13 will always be understood hereinafter to be an angle. Adjoining the first bend 15 of the measurement tube region 16, the measurement tube region 16 extends for instance in a straight line in the direction of a top wall 9 of the fuel tank 1. Besides the first bend 15, the measurement tube region 16 may be provided with an arbitrary number of further bends 27 as well (FIG. 2).

Near each of the two ends of the sound guide conduit 2, there is a respective opening 17 in the wall of the sound guide conduit 2. However, many openings 17 may also be provided, which are distributed over the entire length of the sound guide conduit 2 and act simultaneously as a filter and prevent any contaminants from flowing into the sound guide conduit 2. The openings 17 may for instance be round, oval, rectangular, or polygonal. Fuel is located up to a fill level 4.1 in the sound guide conduit 2. At the height of the fill level 4.1, the fuel surface 5.1 is located in the sound guide conduit 2, as a boundary face between fuel and an idle volume 8.1, located above it, which is filled with a gas mixture for instance comprising air and volatile fuel.

The sound guide conduit 2, comprising the forward-flow region 11 and the measurement tube region 16, is embodied for instance in one piece and is made for instance from plastic but can also be made from metal.

The ultrasonic transducer 3 should be located as close as possible to the inside of the container bottom 12. Inside the sound guide conduit 2, a reference reflection surface 19 is provided, which for instance is flat and protrudes transversely partway into the sound guide conduit 2. The reference reflection surface 19 may, however, also be uneven and may protrude in an arbitrary direction partway into the sound guide conduit 2. It is joined for instance in one piece to the sound guide conduit 2. The reference reflection surface 19 may for instance be a conduit protruding into the sound guide conduit 2 and acting as an opening 17 that reflects a sonic pulse. It is also possible for a plurality of reference reflection surfaces 19 to be disposed in the sound guide conduit 2, both in the forward-flow region 11 and in the measurement tube region 16.

Through the openings 17, fuel can flow into the sound guide conduit 2 and out of the sound guide conduit 2 again. This happens as soon as the fill level 4 and the fill level 4.1 are different. If the fill level 4 is higher than the fill level 4.1, for instance after fueling of the fuel tank 1, fuel flows through the openings 17, located below the fuel surface 5, into the sound guide conduit 2. If the fill level 4.1 is higher than the fill level 4, for instance from consumption of fuel by an internal combustion engine, then conversely fuel flows out of the sound guide conduit 2 into the fuel tank 1. By the exchange of fuel between the fuel tank 1 and the sound guide conduit 2, an equilibrium with fill levels 4 and 4.1 of the same height is always established again after a certain amount of time, as long as the fill level 4 is above the lowermost opening 17, that is, lowermost with reference to the container bottom 12. The fuel flowing into the sound guide conduit, with its volume, displaces gas that flows out of the sound guide conduit 2 into the fuel tank 1 through the openings 17 that are located above the fuel surface 5. Conversely, gas also flows into the sound guide conduit through the openings 17 located above the fuel surface 5 when fuel is flowing out of the sound guide conduit 2. Thus through the openings 17, a pressure equilibrium between the fuel tank 1 and the sound guide conduit 2 is established with respect to both the liquid fuel and the gas.

If the fuel surface 5 drops below the lowermost opening 17 relative to the container bottom 12, then fuel can no longer flow into the sound guide conduit 2. The sound guide conduit 2 reduces or damps the variations in the fill level 4.1 caused by wave action, since because an exchange of fuel between the fuel tank 1 and the sound guide conduit 2 takes place through the openings 17, the fill level 4.1 adapts to the fill level 4 only in delayed fashion and gradually. As a result, wave action in the fuel tank, which can for instance be caused in a motor vehicle when cornering or upon acceleration, does not make the measured fuel volume V of fuel as inaccurate as in conventional devices.

The ultrasonic transducer 3 is for instance a pulse echo sensor, which generates brief sonic pulses in clocked fashion and emits them and measures a transit time t between the instant the pulse is emitted and the instant the reflected sonic pulse or so-called echo returns. However, a different sensor may also be employed, which for instance continuously generates and emits sound waves; in that case, the transit time t is not ascertained and instead a phase displacement between the emitted and reflected sound waves is measured. The ultrasonic transducer 3 is for instance both transmitter and receiver simultaneously. However, a ultrasonic transducer in which the transmitter and receiver are spatially separated can also be employed.

The sonic pulse generated by the ultrasonic transducer 3 at a predetermined intensity is transmitted primarily to the fuel in the sound guide conduit 2. The sonic pulse is propagated in the fuel at the speed of sound in the direction of the sound guide conduit 2 and is conducted through the wall 22 of the sound guide conduit 2, where it finally meets the fuel surface 5.1 and is reflected there. The reflected sonic pulse now moves at the speed of sound in the direction of the sound guide conduit 2 in the opposite direction, back to the ultrasonic transducer 3, which detects the reflected sonic pulse and records the transit time t of the sonic pulse.

It is important that the transit time t of the sonic pulse not be too short, so that the reflected sonic pulse will not arrive back at the ultrasonic transducer 3 too soon, while the ultrasonic transducer 3 is still oscillating with its characteristic attenuation time as a consequence of the most recently generated sonic pulse, and is not yet ready to detect the echo. However, precisely when fill levels 4 are low, the horizontally extending forward-flow region 11 is provided in the sound guide conduit 2 in order to lengthen the transit time; it lengthens the travel of the sonic pulse until it reaches the fuel surface 5.1. Because of the forward-flow region 11, the transit time t required for a sonic pulse to pass through the sound guide conduit 2 as far as a minimal fill level 4 that is still just barely measurable and back again to the ultrasonic transducer suffices to distinguish with certainty between the generated oscillating sonic pulse and its reflected sonic pulse or echo. The length of the forward-flow region 11 thus depends on a minimum transit time that the ultrasonic transducer 3 requires for attenuation, so that it can subsequently accurately detect the reflected sonic pulse.

The transit time t of the sonic pulse must on the other hand not be overly long, either, since the intensity of the sonic pulse decreases as the transit time increases. If the intensity of the sonic pulse is too low, then the ultrasonic transducer 3 can no longer detect the reflected sonic pulse.

The emitted sonic pulse is reflected both from the conduit wall of the first bend 15 and at any further bends that are present. The bending radius, such as the bending radius 14, must be great enough for the sonic pulse to be reflected in the direction of the surface 5.1 of the fluid and move onward in that direction. On the other hand, the bending radius 14 of the first bend 15 must not be too small, so as not to adversely affect the conduction of sonic pulses in the direction of the fuel surface 5.1. An overly small bending radius 14 causes an at least partial reflection of the sonic pulse from the conduit wall 22 back in the direction of the ultrasonic transducer 3, creating an unwanted additional echo; in that case, the sonic pulse reflected from the fuel surface 5.1 is at the most very weak. The additional echo would result in an incorrect transit time measurement.

The fill level 4 is determined by way of the product of the speed of sound times the transit time. By means of a characteristic curve 24 stored in memory in an evaluation unit 23, a conclusion is drawn about the fill volume V.

The device of the invention can measure the fill volume V of the fuel tank 1 down to a minimal fill level 4 by means of the ultrasonic transducer 3. The minimal fill level 4 depends on how close the sound guide conduit 2 is to the inside of the container bottom 12 and furthermore depends on the size of the cross section of the sound guide conduit 2 and on the location of the lowermost opening 17, with respect to the container bottom 12, since the transit time cannot be measured reliably until the forward-flow region 11 is at least partly filled with fuel. The higher the sound guide conduit 2 is relative to the container bottom 12, the higher the lowermost opening 17 is with respect to the container bottom 12, and the larger the cross section of the sound guide conduit 2 is, then the higher the fuel level 5 has to rise before the fuel can flow into the sound guide conduit 2 through the lowermost opening 17 with respect to the container bottom 12 and reach the minimal fill level 4. Below the minimal fill level 4, a fill volume V cannot be measured. It is understood that the minimal fuel level 4 beyond which a fill volume can be measured should be as low as possible. The sound guide conduit 2 must therefore be disposed as close as possible to the container bottom 12, and the cross section of the sound guide conduit must therefore be selected as correspondingly small.

The cross section of the sound guide conduit 2 should preferably be selected to be so small that the fuel surface 5.1 assumes a lenticular shape because of surface tension of the fuel. This assures that the fuel surface 5.1 does not assume an oblique inclination. If the fuel surface 5 in the fuel tank 1 becomes oblique, that is, not parallel to the container bottom 12, for instance when driving uphill or downhill, then the fuel surface 5.1 still maintains its lenticular shape in the sound guide conduit 2, and the measurement of the transit time t is unhindered by an inclined fuel surface 5.1.

The reference reflection surface 19 serves to reduce or compensate for factors, so-called interference factors, that impair the measurement of the fill volume V, such as the temperature and the pressure of the fuel. The sonic pulse that is reflected from the reference reflection surface 19 is called the reference echo. The transit time of the reference echo is known, since it has already been measured once at a defined temperature and a defined pressure, and it is stored in memory, for instance in the evaluation unit 23. A distance travelled by a sonic pulse between the reference reflection surface 19 and the ultrasonic transducer 3 is also known and stored in memory, for instance in the evaluation unit 23. The transit time of the sonic pulses is dependent on the speed of sound in the fuel. The speed of sound in the fuel is dependent on the temperature and pressure of the fuel. By comparison of the transit time of a reference echo, stored in memory in the evaluation unit 23, with the transit time of a reference echo measured during a fill level measurement, interference factors such as a change in the temperature, pressure or density of the fuel can be cancelled out afterward by the evaluation unit 23, so that a measurement of the fill volume that is corrected in this way is virtually independent of the temperature and pressure.

Since the spacing between the top wall 9 and the container bottom 12 of the fuel tank 1 can vary, a flexible portion 39, such as a flexible hose, is provided on the upper end of the sound guide conduit 2. The flexible portion 39 is stretchable in length and can compensate for a variable distance between the top wall 9 and the container bottom 12. The upper end of the sound guide conduit 2 is secured to a cap 40 of the fuel feeding device 6.

Integrating the sound guide conduit 2 and the ultrasonic transducer 3 with the fuel feeding device 6 markedly simplifies mounting the device for measuring a fill level, since the device is built into the fuel tank 1 together with the fuel feeding device 6. Fuel tank manufacturers no longer need to provide mounts for securing devices for measuring a fill level in or onto the fuel tank.

In the device of FIG. 2, those parts that remain the same or function the same as in the device of FIG. 1 are identified by the same reference numerals.

FIG. 2 shows a view of the fuel feeding device 6 with the device of the invention for fill level measurement, with a sound guide conduit that has a plurality of bends. The device of FIG. 2 differs from the device of FIG. 1 in that the measurement tube region 16, because the first bend 15, also has at least one further bend 27 with a bending radius 28 and a deflection 13.1 that points away from the ultrasonic transducer 3. The bending radius 28 of the further bend 27 must once again not be too small, so as not to adversely affect the conduction of sonic pulses in the direction of the fuel surface 5.1. The deflection 13.1 is arbitrary, as long as the conduit slope is positive and the sound guide conduit 2 extends in the direction of the top wall 9. An overly small bending radius 28 causes an at least partial reflection of the sonic pulse from the conduit wall 22, creating an unwanted additional echo, which at the least makes the sonic pulse reflected from the fuel surface 5.1 very weak. Besides the first bend 15, the measurement tube region 16 may be provided with an arbitrary number of further bends 27. Upstream and downstream of each further bend 27, a respective region 29 extending in a straight line with a conduit slope can be provided. However, this is not absolutely necessary. Because of the further bend 27, the conduit slope of two adjacent regions 29 that extend rectilinearly differs.

Figure 3:
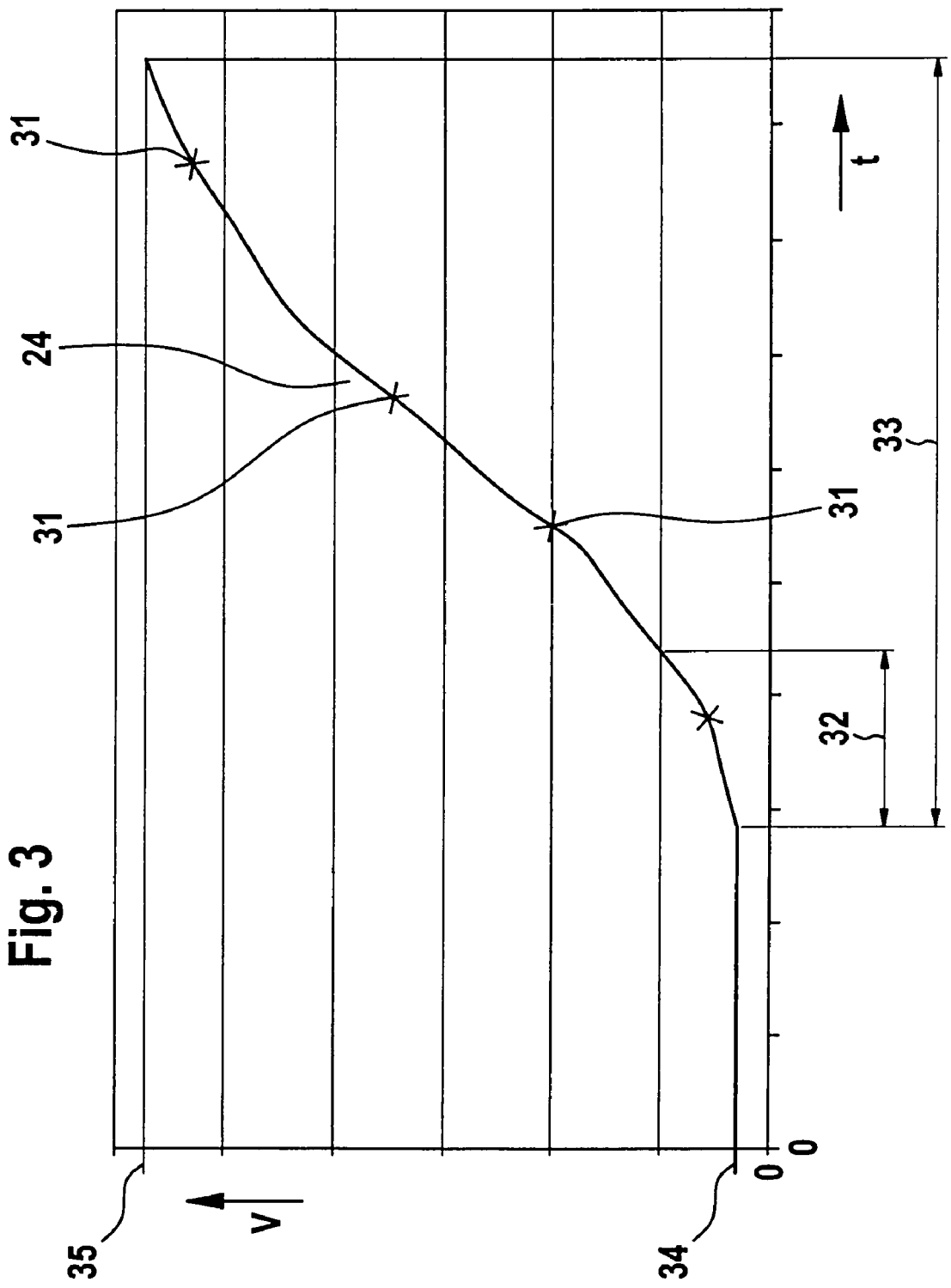
FIG. 3 shows a characteristic curve which represents the fill volume of the container as a function of the transit time.

FIG. 3 shows the characteristic curve 24 of the device of the invention, with the fill volume V plotted on the ordinate and the transit time t on the abscissa. The characteristic curve 24 represents the fill volume V as a function of the transit time t. The characteristic curve 24 is ascertained by experimentation, by measuring the transit time t for known fill volumes V and for the fill volume V in the fuel tank. The result is a transit time interval 33, which includes all the transit times t, from the minimally measurable fill volume 34 up to the maximum fill volume 35 of the fuel tank 1. The characteristic curve 24 is then stored in memory in the evaluation unit 23, for instance by means of a plurality of support points 31, so that for each transit time t, an associated fill volume V can be calculated. The slope of the characteristic curve 24 corresponds to a sensitivity of the measurement. A low slope of the characteristic curve 24 means high sensitivity, since a small change in the fill volume V already causes a major change in the transit time t. A low conduit slope of the sound guide conduit 2, because of the long transit times t associated with it, also leads to a low slope of the characteristic curve 24 and hence high sensitivity. The longer the transit time interval 33 is for a fixed fill volume V, the shallower is the slope of the characteristic curve and the higher are the resolution and the sensitivity of the measured value relative to the fill level.

Since the driver of the motor vehicle, when the fill level 4 is very low, should be provided with very precise information about the fill level in the fuel tank, the characteristic curve 24, at low fill volumes V and short transit times t, must have high sensitivity and therefore a low slope in a residual quantity region 32. The sound guide conduit 2 therefore has a low conduit slope near the container bottom 12.

By varying the number of bends 27 and/or the number of straight regions 29 and/or the conduit slope of the straight regions 29 of the measurement tube region 16 and/or the deflection 13 and 13.1, the sensitivity of the device for measuring the fill level can thus be adapted, over the entire range of the fill volume V, to the shape or geometry of the particular fuel tank 1.

The foregoing relates to a preferred exemplary embodiment of the invention, it being understood that other variants and embodiments thereof are possible within the spirit and scope of the invention, the latter being defined by the appended claims.

We claim:

1. In a device for measuring the level of a fluid in a fuel tank of a motor vehicle, the fuel tank including a sound guide conduit disposed in the fuel tank, a fluid feeding device in the fuel tank, and at least one ultrasonic transducer disposed near one end of the sound guide conduit for generating ultrasonic pulses and for receiving the ultrasonic pulses reflected in the region of the surface of the fluid in the fuel tank, the improvement wherein the sound guide conduit and the ultrasonic transducer are disposed in the fuel tank (1) on an outer circumference of the fluid feeding device (6), wherein the sound guide conduit (2) comprises a horizontal or oblique forward-flow region (11) disposed near the fuel tank bottom (12).

2. The device in accordance with claim 1, wherein the sound guide conduit (2) and/or the ultrasonic transducer (3) is cast, glued, welded, clipped, or screwed onto the outer circumference of the fluid feeding device (6).

3. The device in accordance with claim 1, wherein the forward-flow region (11) is straight or looped.

4. The device in accordance with claim 1, wherein the sound guide conduit (2) comprises at least one bend (15) with one deflection (13) each and/or at least one straight region (29) with a conduit slope angle.

5. The device in accordance with claim 1, wherein the sound guide conduit (2) comprises at least one reference reflection surface (19).

6. The device in accordance with claim 1, wherein the sound guide conduit (2) has at least two openings (17) communicating with the interior of the fuel tank.

7. The device in accordance with claim 1, wherein the sound guide conduit (2) comprises a flexible portion (39).

8. The device in accordance with claim 1, wherein the ultrasonic transducer (3) is simultaneously a transmitter and a receiver.

9. The device in accordance with claim 1, wherein the fluid feeding device (6) is a fuel pumping device.

10. In a device for measuring the level of a fluid in a container, the container including a sound guide conduit disposed in the container, a fluid feeding device in the container, and at least one ultrasonic transducer disposed near one end of the sound guide conduit for generating ultrasonic pulses and for receiving the ultrasonic pulses reflected in the region of the surface of the fluid in the container, the improvement wherein the sound guide conduit and the ultrasonic transducer are disposed in the container (1) on an outer circumference of the fluid feeding device (6), wherein the sound guide conduit (2) comprises a horizontal or oblique forward-flow region (11) disposed near the container bottom (12).

11. The device in accordance with claim 10, wherein the sound guide conduit (2) and/or the ultrasonic transducer (3) is cast, glued, welded, clipped, or screwed onto the outer circumference of the fluid feeding device (6).

12. The device in accordance with claim 10, wherein the forward-flow region (11) is straight or looped.

13. The device in accordance with claim 10, wherein the sound guide conduit (2) comprises at least one bend (15) with one deflection (13) each and/or at least one straight region (29) with a conduit slope angle.

14. The device in accordance with claim 10, wherein the sound guide conduit (2) comprises at least one reference reflection surface (19).

15. The device in accordance with claim 10, wherein the sound guide conduit (2) has at least two openings (17) communicating with the interior of the container.

16. The device in accordance with claim 10, wherein the sound guide conduit (2) comprises a flexible portion (39).

17. The device in accordance with claim 10, wherein the ultrasonic transducer (3) is simultaneously a transmitter and a receiver.

18. The device in accordance with claim 10, wherein the fluid feeding device (6) is a fuel pumping device.

* * * * *